March 5, 1963 J. L. DAUTREMONT, JR 3,080,451

TELESCRIBER COMMUNICATIONS SYSTEM

Filed March 6, 1961 4 Sheets-Sheet 1

INVENTOR.
JOSEPH L. DAUTREMONT, JR.
BY
Christie, Parker & Hale
ATTORNEYS.

INVENTOR.
JOSEPH L. DAUTREMONT, JR.
BY
Christie, Parker & Hale
ATTORNEYS.

INVENTOR.
JOSEPH L. DAUTREMONT, JR.
BY
Christie, Parker & Hale
ATTORNEYS.

TELESCRIBER COMMUNICATIONS SYSTEM

Filed March 6, 1961

4 Sheets-Sheet 4

United States Patent Office 3,080,451

Patented Mar. 5, 1963

3,080,451

TELESCRIBER COMMUNICATIONS SYSTEM

Joseph L. Dautremont, Jr., Los Angeles, Calif., assignor to Telautograph Corporation, Los Angeles, Calif., a corporation of Virginia Filed Mar. 6, 1961, Ser. No. 93,666

11 Claims. (Cl. 178—19)

This invention relates to telescribing equipment, and more particularly, is concerned with control circuitry for interconnecting telescriber units to provide two-way communication.

Telescribing equipment for translating handwritten messages electrically over transmission wires is well known. Such equipment involves, at a transmitting station, a stylus manipulated by an operator as he would a writing instrument such as a pin. Through mechanical linkage tied to the stylus, motions are resolved into two components for controlling a pair of transducers. The coordinates of position of the stylus are translated by the transducers to corresponding electrical signals. At the receiver end, these electrical signals are used to control a writing device to reproduce the movement of the stylus.

Generally, telescribers are only used for communicating one-way between two stations. However, when two-way communication is required, it has been the practice to provide a transmitter with a writing stylus at both stations and a receiver with a writing element at both stations. These may be separately connected, or they may share a common transmission line. In trying to provide two-way communication over a common transmission line, a number of problems develop since the system requires that two position signals, a stylus up-or-down signal, a stop-start signal, a paper shift signal, and a warning or notification signal all be carried by the same line. Furthermore, these signals must all be capable of being initiated from either end. Also the first unit to send must lock out the transmitter operation of the other unit until a complete message has been received at the other unit.

In copending application Serial No. 70,489, filed November 21, 1960, there is described a telescriber unit which is designed to function as either a transmitter or a receiver. The same power driven writing element is employed in either event. In the transmitter mode, the writing member, by means of a sensing element, follows the movement of a manually controlled stylus. In the receiving mode, the writing element moves in response to position signals from the transmitter.

The present invention is directed to an improved circuit for interconnecting two such identical units as transceivers. The circuit provides for communication over a pair of conductors and a common ground between the two units, with priority of control from either unit to establish one unit as a transmitter and the other unit as a receiver. Paper shift control is provided by which automatic paper shift is achieved at the unit operating as a receiver. Paper shift is achieved without loss of priority control at the transmitting unit. Controlled signal amplification is provided at both units to reduce noise effects and increase accuracy of reproduction.

In brief, the invention comprises a pair of identical telescriber units having a common ground and a pair of wires connecting the two units. Each unit includes a writing surface across which a mechanically supported writing element is movable. First and second drive means move the writing element along two coordinates of position. First and second signals, indicative of the two coordinates of position of the writing element, are generated by transducer means.

By relay controlled switching means, operation of one of the units as a transmitter automatically connects the first and second signals to the respective wires through summing amplifiers, with low-pass filters connecting the output of the amplifiers to the input of the amplifiers at the transmitter to form low-pass filter feedback paths. At the receiver, the respective wires are connected to the inputs of the summing amplifiers through the same low-pass filters together with the first and second position signals. The outputs of the summing amplifiers are connected to first and second drive means at the receiver unit.

Paper shift operation is established by relay means responsive to momentary grounding of both wires of the line. Paper shift is initiated by pressing a switch at the transmitting station. Also automatic paper shift is provided when the stylus is replaced in its holder at the completion of a message. A two part form can be used with an automatic double paper shift or single paper shift taking place at the end of a message, depending upon whether the second half of the form has been used or not.

For a more complete understanding of the invention, reference should be made to the accompanying drawings, wherein.

Figure 1:
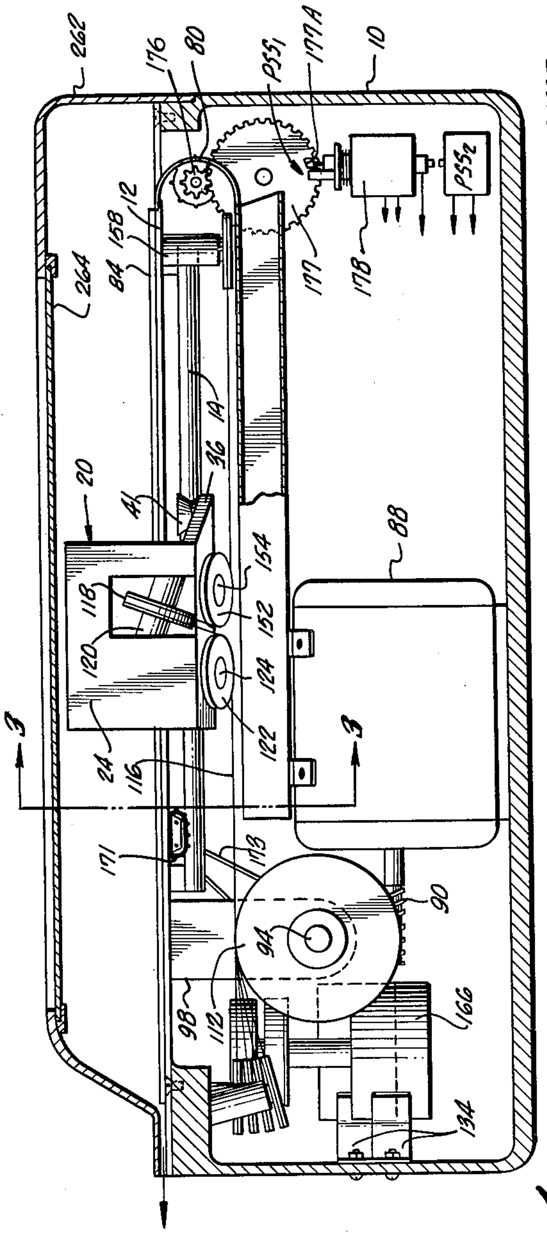
FIG. 1 is a side elevational view with the cover and outer box frame cut away.

Referring to FIGS. 1-5 of the drawings in detail, the numeral 10 indicates generally the outer frame of the machine, which preferably is in the form of a single cast box structure open at the top. Mounted on the outer frame 10 is a chassis support plate 12. This plate, over a substantial portion of its length, is narrower than the box frame 10, leaving elongated open regions on either side of the plate 12. Secured underneath and extending parallel to one edge of the plate 12 is a guide rod 14 of circular cross section. A flat guide plate 16 extends parallel with the opposite edge of the plate 12 and is supported in parallel relationship thereto by lugs such as indicated at 18 in FIG. 3.

A bridge assembly, indicated generally at 20, includes a pair of end members 22 and 24 joined above the surface of the plate 12 by a pair of guide members 26 and 28. The end member 22 includes a bracket portion 30 which extends below the bottom surface of the plate 12 and is slotted as indicated at 32, the slot receiving the flat guide plate 16. Suitable flat bushings 34 engage the surfaces of the flat guide plate 16 to give sliding vertical support to the end member 22.

The end member 24 is similarly provided with a bracket portion 36 from which are rotatably supported two sets of opposed grooved guide wheels 38, 39 and 40, 41. The grooved guide wheels engage the guide rod 14 at spaced points, providing both lateral and vertical guidance and support to the end member 24.

Movably supported on the guide members 26 and 28 of the bridge assembly 20 is a carriage assembly, indicated generally at 42. As thus shown in FIG. 5, the bridge spanning guide member 26 is channel shaped, providing a lower flange 44 and an upper flange 46. Carriage assembly 42 includes a pair of spaced guide rollers 48 and 50 which ride on the inside of the lower flanged portion 44. A coil spring 51 carried in a hole in the carriage assembly 42 presses against the upper flange 46.

The guide member 28 is provided with an upper groove 52 and a lower groove 54. The upper groove 52 is engaged by a pair of rollers 56 and 58 which are rotatably supported by the carriage assembly 42. A similar pair of rollers, one of which is indicated at 60, engage the groove 54 and are rotatably supported from the carriage assembly 42. In this way, the carriage assembly 42 is guided for lateral movement along the guide members of the bridge assembly 20. Thus it will be seen that the combination of the bridge and carriage permits movement of the carriage assembly 42 in two dimensions over a predetermined area.

Supported from the carriage assembly 42 is a pen 62 having an ink reservoir 64. The pen and ink reservoir is supported on the end of an arm 66 which is supported by pivots 68 from a pair of lugs 70 projecting from the carriage assembly 42. An armature plate 67 which is integral with the arm 66 extends below the carriage assembly 42. A pair of solenoids 72 and 74 mounted in the carriage assembly 42 have their pole faces positioned above the armature plate 67. In this manner, when the solenoids are energized, the armature plate 67 is drawn towards the solenoids and the pen 62 is pressed downwardly towards the plate 12. When the solenoids are not energized, the armature plate 67 is sufficiently heavy to lift the pen 62 away from the plate 12 about the pivot 68.

The pen 62 thus may be made to engage a writing surface such as provided by a strip of paper 76 which passes over the top surface of the plate 12. The paper strip 76, which may be folded and stored as a pack beneath the plate 12 in a hollow paper receptacle 78, passes around a semi-circular guide 80 and along grooves provided by guide strips 82 and 84 positioned along the edges of the upper surface of the plate 12.

To produce a visual trace on the paper by remote control, movement is imparted to the carriage assembly 42 and the bridge 20 from an electric motor 88 through a special clutch arrangement and cable connection. The drive motor 88 is mounted on the bottom of the main frame box 10. A worm gear 90 driven by the motor 88 engages a worm wheel 92 mounted on a horizontal shaft 94. Shaft 94 is journalled in bearings carried in bearing support brackets 96 and 98 projecting downwardly from the plate 12.

Mounted at either end of the shaft 94 are two pairs of magnetic clutches, indicated generally at 100 and 102. The pair of clutches 100 include a common drive member 104 which is continuously rotated by the shaft 94, and a pair of driven members 106 and 108. The pair of clutches 102 similarly include a common drive member 110 and a pair of driven members 112 and 114. Driven members 106, 108, 112 and 114 each comprise an outer cylindrical drum surface. Electromagnetic means, not shown, is located within the region defined by the outer drum surface of each of the driven members and arranged such that electrically energizing any one of four electromagnets respectively couples the driven members 106, 108, 112 and 114 to the drive shaft 94 through the drive members 104 and 110 respectively. Electromagnetic clutches of the general type used in this present invention are well known in the art and, therefore, it is not believed necessary to describe such clutches in more detail. See, for example, the clutch described in Patent No. 2,706,544. The clutches have frictional surfaces which are pressed together by electromagnets, the pressure being controlled by the amount of current passed through the electromagnets.

By means of a special cable arrangement, the four electromagnetic clutches can be used to control movement of the carriage from the drive motor 88. The cable arrangement includes two lengths of cable, both lengths being anchored at the two ends thereof to the carriage assembly 42. The first length of cable, indicated at 116, extends from the end anchored to the left-hand side of the carriage assembly 42 as viewed in FIG. 4 over a pulley 118 carried by a shaft 120 in the end member 24 of the bridge assembly 20. After passing down around the pulley 118, the first cable section 116 passes around a pulley 122 journalled on a stud shaft 124 supported by and projecting down from the bracket portion 36 of the bridge assembly. The first cable section 116 then makes several turns around the drum surface of the driven member 114. The cable may be positively secured to the driven member 114 at one point since a portion of the cable never leaves the drum surface through the maximum extent of movement.

The cable 116 then makes a quarter turn around a guide pulley 126 which is rotatably supported from the main outer frame 10 by stud shaft 128. The cable section 116 after making a quarter turn around the pulley 126 makes several turns around a drum 130 which is secured to the shaft of a potentiometer 132. Potentiometer 132 is supported from the plate 12 by a suitable bracket 134.

After passing around the drum 130, the cable section 116 takes a quarter turn around a guide pulley 136 rotatably supported by a stud shaft 138 from the outer frame 10, and then passes in several turns around the drum surface of the driven member 106. Coming off the driven member 106, the cable section 116 extends the full length of the plate 12 to a pulley 140 rotatably supported on the end of a stud shaft 142 extending down from the plate 12. After making a half turn around the pulley 140, the first cable section 116 makes a quarter turn around a pulley 144 rotatably supported on a stud shaft 146 which is secured to the underside of the portion 30 of the carriage end frame member 22.

After making a quarter turn around the pulley 144, the cable 116 passes around a pulley 148 journalled on a shaft 150 in the end member 22 and thence passes parallel to the guide member 26 back to the carriage assembly 42 where it is anchored.

Figure 2:
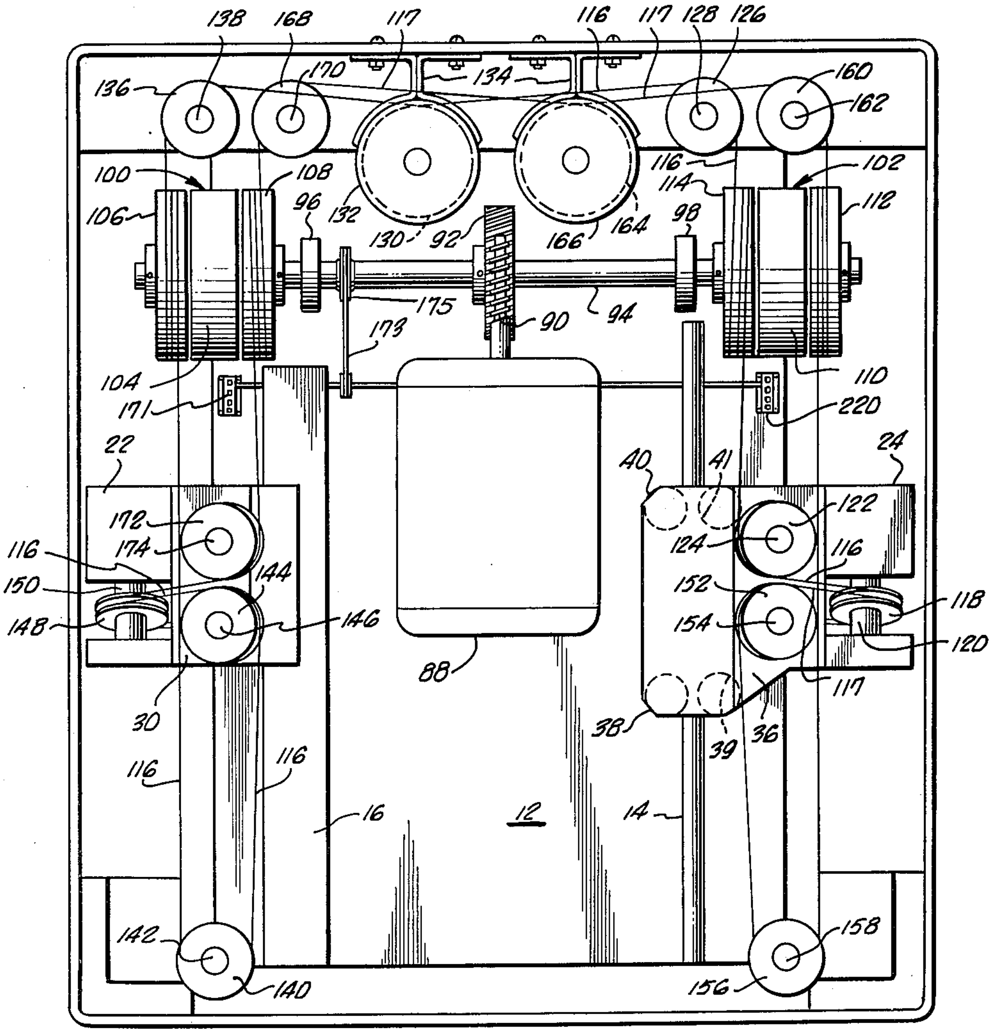
FIG. 2 is a bottom view with the outer box frame cut away.

In a similar fashion, a second cable section 117 extends from one end anchored to the carriage assembly 42 around the pulley 118 and makes a quarter turn around a pulley 152 rotatably supported by stud shaft 154 secured to the lower surface of the portion 36 of the bridge and frame member 24, as best seen in FIG. 2. After making a half turn around a pulley 156 rotatably supported on a stud shaft 158 extending from the bottom of plate 12, the cable 117 takes several turns around the drum surface of the driven member 112. After leaving the drum surface of the driven member 112, the cable 117 makes a quarter turn around a pulley 160 rotatably supported on a stud shaft 162. The cable 117 then makes one or more turns around the drum 164 secured to the shaft of a potentiometer 166 supported by the bracket 134 in the same manner as the potentiometer 132.

After making a quarter turn around a pulley 168 rotatably supported on a stud shaft 170 from the frame 10, the cable 117 makes several turns around the drum surface of the driven member 108 and then makes a quarter turn around a pulley 172 rotatably supported on a stud shaft 174 secured to the under surface of the portion 30 of the bridge end member 22. After making a quarter turn around the pulley 172, the cable 117 passes around the pulley 148 and thence back to the carriage assembly 42 to which it is anchored.

With this cable arrangement, energizing of any one of the four clutches produces equal movement of the bridge and carriage. The result is movement of the pen along one or the other of the two mutually perpendicular 45° diagonal axes. The direction of movement along either of these axes is determined by which of the two clutches associated with a particular one of the two cable sections is energized.

If two clutches are simultaneously fully energized, the two clutches being associated respectively with each of the two cable sections 116 and 117, movement of the pen along a zero or X axis or along a 90° or Y axis is produced. Again the direction of movement is determined by the combination of two clutches selectively energized. By varying the relative speed at which the two cables are driven (by varying the clutch energizing currents), movement in any direction over the writing surface can be obtained. Control of the four clutches to obtain the desired speed and direction of drive of the two cable sections 116 and 117 in response to control signals is provided by the control circuit shown schematically in FIG. 6.

As best seen in FIGS. 1 and 2, the paper is engaged by a tractor drive 171 having lugs which engage holes along the edge of the paper form. The tractor drive 171 is driven by a belt 173 from a pulley 175 on the shaft 94 driven by the motor 88. An indexing arrangement is provided which locks the paper, causing the belt 173 to slip and maintain the paper under tension. When the indexing mechanism, hereinafter described, is released, the belt drive then advances the paper.

The indexing mechanism includes a pair of sprocket wheels 176 which engage the holes along the two edges of the paper, the sprocket wheels 176 being located adjacent the semi-circular guide 80. A gear wheel 177 is rotated by the sprocket wheels 176 through a suitable gear drive as the paper is advanced by the tractor 171. The gear wheel 177 is provided with a lug 177A which engages the stop provided by the plunger of a solenoid 178. Normally the lug 177A engages the plunger of the solenoid 178, locking the gear wheel 177 and the sprocket wheels 176 against rotation. This prevents the paper from being advanced by the tractor drive 173. When the solenoid 178 is momentarily energized, the paper drive is released, permitting the paper to advance until the lug 177A again comes into engagement with the plunger of the solenoid 178, namely, after one revolution of the gear wheel 177.

The plunger of the solenoid 178 is normally insulated from ground except that it can be grounded by contact with the lugs 177A. Thus a paper shift switch $PSS_1$ is provided between the plunger and the lug which is open during the time when the paper is advancing and is closed whenever the paper is stopped. A second paper shift switch $PSS_2$ of a push button toggle type is actuated to open or closed condition every time the solenoid 178 is energized by the downward movement of the plunger. The switches $PSS_1$ and $PSS_2$ are used in controlling the automatic paper shift operation hereinafter described in connection with FIG. 6.

The apparatus as thus far described can be employed as either the transmitter or receiver of a telescribing system. Movement of the carriage assembly element 42 of the transmitting unit is sensed by the potentiometers 132 and 166 and translated into signals which are sent to a receiver unit. At the receiver unit, the received signals are compared with the signals derived from the potentiometers and the respective electromagnetic clutches controlled to move the carriage element at the receiver station in a manner to maintain the difference between the received signal and the signal across the potentiometers at a substantially zero difference.

Figure 3:
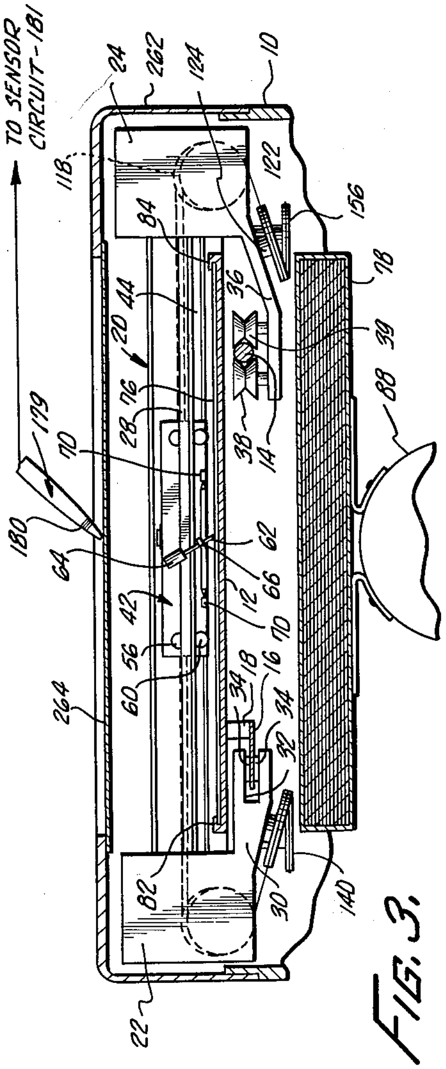
FIG. 3 is a fragmentary sectional view taken on the line 3—3 of FIG. 1.

When operating the unit described above as a transmitter, the operator uses a writing stylus, a portion of which is indicated at 179 in FIG. 3. The writing stylus is provided with a coil 180 which is connected back to a sensor circuit, indicated by the block 181 in FIG. 6. An inductive sensor element 185 is mounted on the top of the carriage assembly 42 which is also connected back to the sensor circuit 181. As described in detail in the copending application Serial No. 70,489, filed November 21, 1960, movement of the stylus 180 relative to the sensor element 185 produces at the output of the sensor circuit 181 a pair of displacement error signals which are proportional to the direction and degree of displacement between the stylus and the sensor element. These error signals are used to control the four clutches to reposition the bridge assembly 20 and carriage assembly 42 so as to maintain the sensor element directly below the stylus during the writing operation. This is described in more detail below in connection with the schematic diagram of FIG. 6.

Figure 6:
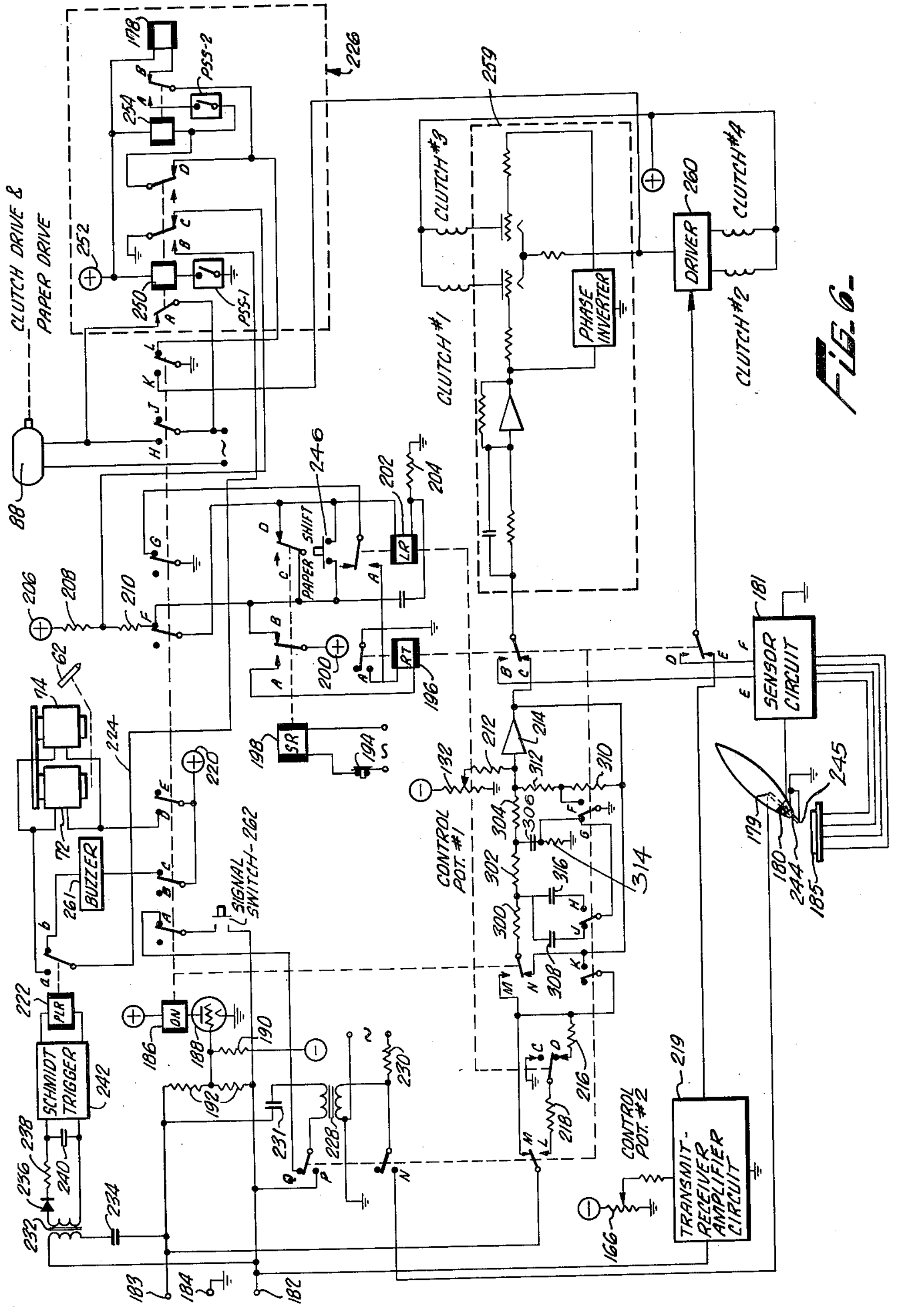
FIG. 6 is a schematic diagram of the control circuit of the telescriber unit.

Referring to FIG. 6 in detail, there is shown schematically the control circuitry associated with each telescriber unit. The control circuit is arranged to provide for operation of a unit either as a transmitter or a receiver. Two identical communicating units are connected by a transmission line including a pair of conductors connected to terminals 182 and 183 and a common ground connected to terminal 184.

Each unit has an "off" and "on" condition established by an ON-OFF relay 186 driven by a detector circuit including a triode 188 for driving the coil of the relay 186. The triode 188 has its control grid connected to a negative bias source through a grid resistor 190 which normally cuts the tube off, de-energizing the relay. This corresponds to the "off" condition of the units and is the normal standby operating condition. The control grid of the tube 188 is also connected to the center point of a voltage divider 192 consisting of a pair of relatively large resistors connected in series between the terminals 182 and 183. With the terminals 182 and 183 at ground potential, the tube 188 is biased below cut-off. Only by placing a positive potential on the line is the detector actuated so as to place the associated unit in the "on" condition by actuating the relay 186.

To initiate communication, a switch 194 is closed at one of the units. For example, the switch 194 may be arranged to be closed automatically when the stylus is picked up by an operator at one of the units in preparation to sending a message. Closing the switch 194 at one of the units automatically establishes that unit as a transmitter and the other unit on the line as the receiver. This is accomplished by means of a Receive-Transmit relay 196 which is energized in the transmitting unit but remains unenergized in the receiving unit. To this end, the closing of the switch 194 actuates a Start relay 198. This completes a circuit through the Receiver-Transmit relay 196 from a potential source 200, through the normally open contact *a* of a Lock relay 202, and through the normally closed contact *g* of the On-Off relay 186 back to ground. The Lock relay 202 is normally energized when a unit is in standby operating condition. The Lock relay is energized from the potential source 200 through the normally closed contact *b* of the Start relay 198, through the normally closed contact *f* of the On-Off relay 186 and back to ground through a resistor 204. A holding circuit is also provided for the Lock relay 202 from a potential source 206 through a pair of series resistors 208 and 210 connected to the normally closed contact *f* of the On-Off relay 186. The relay contacts of the Start relay 198 are arranged such that the normally open contact *a* closes before normally closed contact *d* is opened. Thus the Receive-Transmit relay 196 is energized before the Lock relay 202 is released. A holding circuit is completed by normally open contact *a* of the Receive-Transmit relay 196 when the Lock relay 202 drops out. In this manner, by closing switch 194 at one of the units, that unit is put in the "transmit" condition in which the Receive-Transmit relay 196 is energized and the Lock relay 202 is de-energized. The receiving unit remains with the Receive-Transmit relay 196 de-energized and the Lock relay 202 energized.

When the Receive-Transmit relay 196 is energized, it connects the D.C. signals developed across the control potentiometers 132 and 166, operated by movement of the writing element across the paper, to the terminals 183 and 182 respectively. Since the two signal channels are identical, only the signal channel associated with the terminal 183 will be described in detail. The potential derived from the potentiometer 132 is connected through a summing resistor 212 to the input of a D.C. amplifier 214. The output of the amplifier 214 is connected to the terminal 183 through the normally open contact *k* of the Receive-Transmit relay 196, through a resistor 216 and the normally closed contact *d* of the Lock relay 202, through a series current limiting resistor 218 and the normally open contact *l* of the Receive-Transmit relay 196 to the terminal 183. Since the amplifier 214 inverts the polarity of input, this places a positive potential on one side of the line. In a similar fashion, a positive potential is applied to the other side of the line derived from the control potentiometer 166 through an identical transmit-receive amplifier circuit 219. The positive potential placed on the line by the "transmit" condition of one of the units, by means of the detector circuit including the triode 188, operates the On-Off relay 186, placing both units in the "on" condition. Thus picking up the stylus and closing the switch 194 at one of the telescriber units places that unit in a "transmit-on" condition, while the other unit is placed in a "receive-on" condition.

Actuating the On-Off relay 186 accomplishes several things. First, through the normally open contact *h*, a circuit is completed from a voltage source to the drive motor 88. At the same time, a ground connection is completed through the normally open contact *k* to a pair of clutch driver circuit 259 and 260 to render them operative. The clutch driver circuits are described in detail in copending application Serial No. 70,489 mentioned above. At the same time, the pen-lift solenoids 72 and 74 are connected to a positive potential source 220 through the normally open contact *d* of the On-Off relay 186. The circuit is completed back to ground through the normally closed contact *a* of a Pen-Lift relay 222, operated in a manner hereinafter described, through a lead 224 normally connected to ground through a paper shift control circuit 226, hereinafter also described in detail.

Subsequent operation by movement of the writing stylus 179 at the transmitter station produces, through the sensor circuit 181, error signals which are applied to the clutch control circuits 259 and 260 through the contacts *b* and *d* respectively of the Receive-Transmit relay 196. This provides the power writing feature described in detail in the copending application Serial No. 70,489, mentioned above. The D.-C. control signals developed across the potentiometers 132 and 166 respectively are amplified and coupled to the line to control the movement of the writing pen at the receiver unit.

It has been found that in transmitting signals representative of handwritten messages, that an upper frequency of the order of 10 to 12 cycles per second is the highest frequency required. In order to minimize the effects of noise and other transient conditions that may arise, it has been found desirable to emphasize the signals in the upper end of the usable frequency range at the transmitting end and to de-emphasize these same signals at the receiving end to provide a higher signal-to-noise ratio in the transmission link. Also the frequencies above the usable range are strongly attenuated. This is accomplished by a novel switching arrangement which permits a low-pass filter to be connected in a feedback circuit of the amplifier such as the amplifier 214 at the transmitting end and the low-pass filter to be connected between the line and the input to the amplifier at the receiving end.

Figure 7:
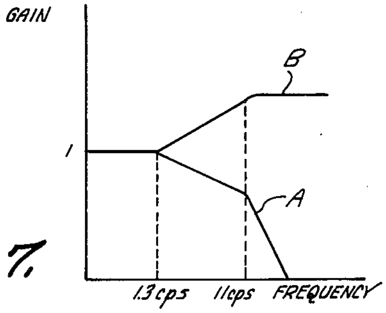
FIG. 7 is a diagram showing the characteristics of the amplifier circuits at the transmitter and at the receiver.
Figure 4:
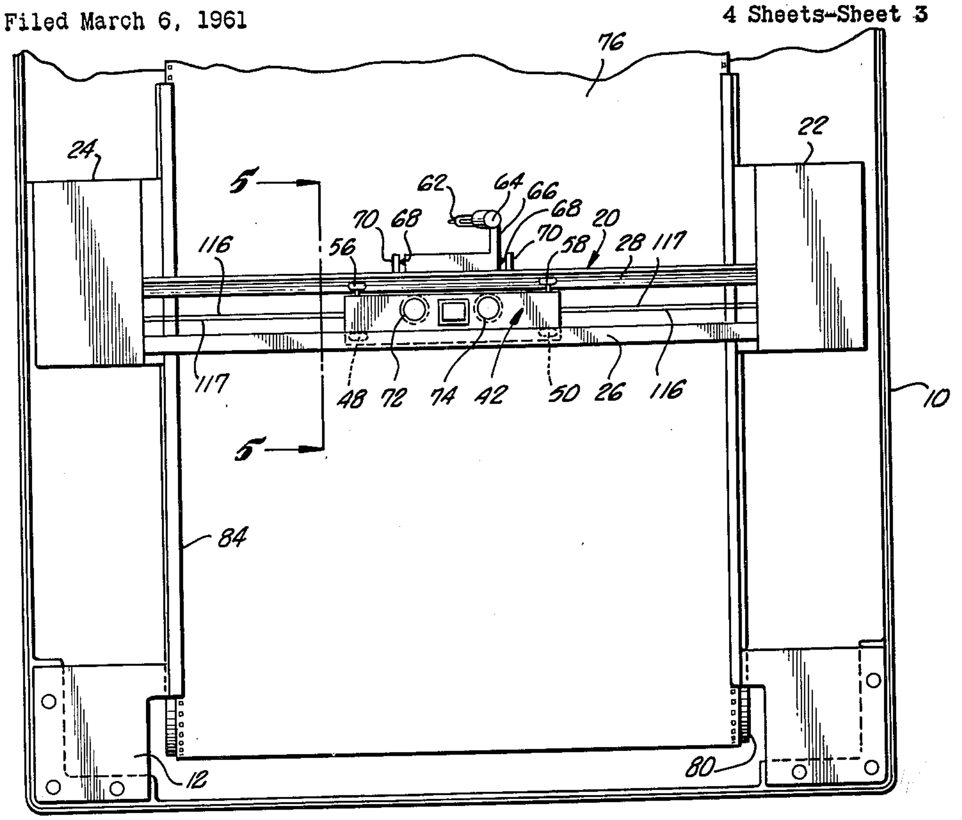
FIG. 4 is a partial top view.
Figure 5:
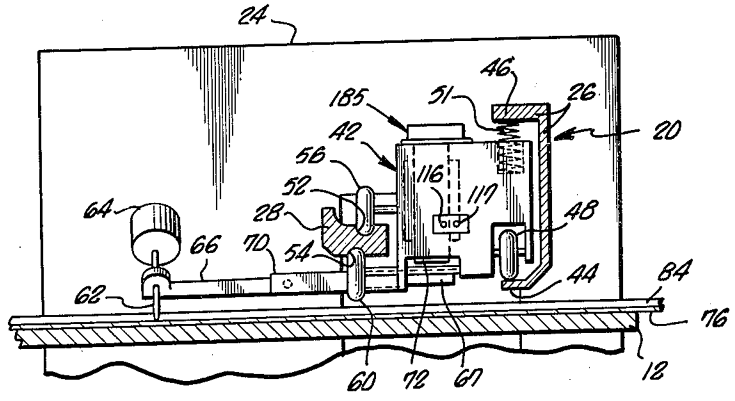
FIG. 5 is a fragmentary sectional view taken on the line 5—5 of FIG. 4.

According to the well known theory of operational D.C. amplifiers, as developed in the analog computer art for example, a network in the feedback circuit has an inverse effect to that of the same network in the input circuit. Thus a low-pass filter in the feedback circuit of an operational amplifier has the same effect as a high-pass filter in the input circuit. This permits the same network to be used in both the transmitter and amplifier unit with a simple switching arrangement for connecting the filter either in the input circuit or in the feedback circuit as the case may be. FIG. 7 shows the frequency response characteristic of the amplifier network at the respective units when connected as a transmitter and as a receiver.

When a unit is in the "receive-on" condition, the line signals are applied through the low-pass filter to the amplifier in the following manner. As shown in FIG. 6, the terminal 183 is connected through the normally closed contact *m* of the Receive-Transmit relay 196 through the normally open contact *m* of the On-Off relay 186 to the input of the amplifier 214 through a low-pass filter. The low-pass filter consists of three series resistors 300, 302 and 304 and a pair of shunting capacitors 306 and 308 connected to ground respectively through the normally closed contacts *g* and *j* of the Receive-Transmit relay 196. A feedback path for the amplifier 214 is provided through two series resistors 310 and 312 coupling the output of the amplifier back to the input of the amplifier. The values of the resistors 300, 302 and 304 and the shunting capacitors 306 and 308 are chosen to provide fairly sharp cut-off for frequencies above 11 cycles per second. Curve A of FIG. 7 shows the characteristics of the low-pass filter and amplifier for the "receive" condition. It will be noted that the output of the amplifier is the sum of the negative potential from the potentiometer 132 and the positive potential derived from the input terminal 183. This results in a displacement error signal which is applied to the input of the clutch driver circuit 259 to control the writing element.

When the unit is operating as a transmitter, with the Receive-Transmit relay 196 energized, a feedback path is provided through the same filter by means of a circuit completed from the normally open contact *k* of the relay 196 to the normally open contact *m* of the On-Off relay 186 and through the series resistors 300, 302 and 304 of the filter to the input of the amplifier 214. The filter is modified somewhat in the "transmit" condition so as not to have as sharp a cut-off above the 11 cycle frequency level. To this end, a resistor 314 is connected in series with capacitor 306, and a smaller capacitor 316 is connected in through the contact *h* of the relay 196 in place of the shunting capacitor 308. The reason for this is that it is not desirable to produce an emphasis of signals above the 11 cycle per second design point, since any signals in the frequency range above 11 cycles are not desirable. At the same time, a ground is provided through normally open contact *f* to the junction of resistors 310 and 312 to eliminate the feedback path through these resistors. Curve B of FIG. 7 shows the characteristics of the amplifier network in the "transmit" condition. Thus it will be seen that by a simple switching arrangement controlled by the Receive-Transmit relay 196, the amplifier channel at each unit can be modified according to whether it is operating as a transmitting or a receiving unit.

The up and down movement of the stylus at both the transmitter and receiver units, by means of the associated solenoids 72 and 74, is as follows. Normally a 60-cycle signal is connected across the terminals 182 and 183 at the transmitter unit by means of a transformer 228. The primary is connected to the A.C. signal source through a series resistor 230. When the Receive-Transmit relay 196 is energized, the secondary of the transformer 228 is connected across the terminals 182 and 183 through the normally open contact *p* of the Receive-Transmit relay 196 and a series connected D.C. blocking capacitor 231. This places a 60-cycle A.C. signal on the line. This A.C. signal is applied to the primary of a transformer 232, at both the receiving and transmitting units, through a D.C. blocking capacitor 234. The voltage across the secondary of the transformer 232 is rectified by a diode 236 and filtered by an integrating network including a resistor 238 and capacitor 240. The voltage derived across the capacitor 240 is applied to the input of a Schmidt trigger circuit 242. The Schmidt trigger is arranged such that in the presence of an input potential of the right polarity, the pen-lift relay 222 is energized, completing a circuit through the pen-lift solenoids 72 and 74. In this way, when an A.C. signal is applied across the line, the pen-lift solenoids at both the transmitting and receiving units are energized, engaging the writing elements with the writing surfaces at both units.

The stylus 179 is provided with a normally open pressure-operated switch 244 connected in series with the normally open contact *n* of the Receive-Transmit relay 196. The switch 244 is closed when the tip 245 of the stylus 179 is pressed against the glass writing surface. When the switch 244 is closed, it connects the ungrounded side of the A.C. signal source to ground through the series resistor 230, thus removing the voltage from the primary of the transformer 228. This causes the Pen-Lift relay 222 to be energized, energizing the pen-lift solenoids 72 and 74, and causing the writing element to engage the writing surface. In this way, vertical movement of the writing stylus into and out of engagement with the glass surface 264 causes engagement or disengagement of the writing element 62 with the writing surface.

According to one feature of the present invention, the paper form used in the telescriber units is divided into two parts. A message may be written on only one part if it is a relatively short message or both parts may be used for a longer message. In either event, when the message is completed and the stylus is placed back in its holder, opening the switch 194, an automatic paper shift takes place at both the transmitter and the receiver units. This paper shift advances the complete form from the machine. Only a single shift is required if the second half of the form has been used, but a double shift is required if only the first half of the form has been used. In addition to the automatic shift, at the completion of a transmitted message, a manual shift is provided by which the paper can be shifted to go from the first half to the second half of the form or by which transmission of additional shifts can be made without replacing the stylus in its holder. The paper shift control is effected in the following manner by the paper shift control circuit 226.

Considering first the manual paper shift, this is initiated at the transmitting unit by paper shift manual switch 246. Closing this switch completes a circuit through the Lock relay 202 from the potential source 206 through the resistors 208, 210 and 204. It should be noted that closing the switch 246 at the receiving unit has no effect since the Lock relay 202 remains energized at the receiving unit. When the Lock relay 202 is energized, it connects both the terminals 182 and 183 at the transmitting unit to ground. For example, the terminal 183 is grounded through the normally open contact *c* of the Lock relay 202. A ground connection is provided through the series resistor 218, the normally open contact *l* of the Receive-Transmit relay 196 to the terminal 183. As a result, the On-Off relay 186, at both the transmitting and receiving units, is de-energized.

As described above in connection with FIG. 1, a switch $PSS_1$ is closed whenever the paper shift mechanism is locked. The switch $PSS_2$, being a toggle switch, is opened and closed on alternate cycles of the paper shift operation. In operation, the switch $PSS_2$ is arranged to be open when the first half of the form is in the writing position and closed when the second half of the form is in writing position. The switch $PSS_1$, when closed, energizes a relay 250 from a potential source 252. Thus relay 250 is always energizes when a paper shift operation is initiated.

With relay 250 energized, when the On-Off relay 186 drops out at both the transmitter and receiver units, the motor 88 is turned off by the opening of the normally open contact *h* of the relay 186. At the same time, the paper shift solenoid 178 is energized from the potential source 252 through the normally closed contact *b* of a relay 254 and through the normally closed contact *l* of the On-Off relay 186. The inertia of the drive motor 88 and the associated clutches is such that the paper is driven forward when the solenoid 178 releases the paper indexing mechanism. As a result, the switch $PSS_1$ is opened permitting the relay 250 to drop out. This completes a circuit to the motor 88 through the normally closed contact *a* of the relay 250. At the same time, the relay 254 is energized from the potential source 252 through the normally closed contact *d* of the relay 250 and the normally closed contact *l* of the On-Off relay 186. This breaks the circuit through the solenoid 178. The paper continues to advance until the indexing mechanism stops the paper. At this time, the switch $PSS_1$ is again closed and the relay 250 becomes energized.

When the On-Off relay 186 drops out at the beginning of the manual paper shift operation, it holds the Lock relay 202 energized from a potential source 206. However, when the relay 250 drops out, it provides a ground connection through the normally closed contact *c* of the relay 250 to the series connection point of the resistors 208 and 210. This permits the Lock relay 202 to drop out, breaking the ground connection of the contact *c* of the Lock relay 202 and restoring positive potential to both sides of the line. As a result, the On-Off relays 186 at both the receiver and transmitter units are again energized. Thus the transmitting unit is restored to its "transmit-on" condition and the receiving unit is restored to its "receive-on" condition. It will be evident that the manual paper shift does not relinquish control by the operator at the transmitting unit.

Automatic paper shift is initiated when the stylus is returned to its holder, opening the switch 194 at the transmitting unit. This provides an automatic single or double paper shift, depending upon whether the second part of the form or the first part of the form is in writing position. Consider first the double shift operation when the first part of the form is in writing position. In this event, the switch $PSS_2$ is closed. When the switch 194 opens, the Start relay 198 drops out. This releases the Receive-Transmit relay 196 and energizes the Lock relay 202. Operation continues in the same fashion as the manual paper shift described above with the exception that the Lock relay 202 now remains energized even after the relay 250 drops out since it is energized from the potential source 200 rather than the potential source 206, which means that the On-Off relay 186 does not come back on during the shift operation. When the first half of the form is shifted out, the switch $PSS_1$ is closed, again energizing the relay 250. Because the On-Off relay 186 has not again been energized, the relay 254 remains energized until relay 250 is again energized, breaking the circuit through the normally closed contact *d* of the relay 250. When the relay 254 drops out, an energizing circuit is restored to the solenoid 178 from the potential source 252 and the normally closed contact *b* of the relay 254 and normally closed contact *l* of the On-Off relay 186. This starts the second shift for shifting out the second half of the paper form.

As soon as the shift of the second part of the form is initiated, the switch $PSS_1$ again opens, releasing the relay 250 and again energizing relay 254 through the normally closed contact *d* of the relay 250. During the second shift, the switch $PSS_2$ is closed which holds relay 254 energized at the completion of the second shift when the relay 250 is again energized. This interrupts further shifting since as long as the relay 254 is energized, the solenoid 178 cannot be energized. The relay 254 remains energized until the On-Off relay 186 re-establishes an "on" condition during transmission of a subsequent message.

If the paper form has already been shifted to the second part at the time the stylus is returned to its holder, automatic shift takes place in the same manner as described above except that $PSS_2$ is now closed so that only a single shift operation can take place.

Each unit is provided with a warning buzzer 261 which can be operated from either unit before the stylus from either unit is removed from the holder. The buzzer is energized from the potential source 220 through the normally closed contact *c* of the On-Off relay 186. A circuit is completed back to ground through the normally closed contact *b* of the relay 222 and through the normally open contact *b* of the relay 250. The buzzer is operated by a push button signal switch 262. When the signal switch is closed, it places an A.C. signal derived from the secondary of the transformer 228 across the line. This acts to de-energize the relay 222, which, as pointed out above, is normally energized in the absence of an A.C. signal on the line. When the relay 222 drops out, the buzzer 261 is energized producing a warning signal. Since the buzzer can only operate when the On-Off relay 186 is de-energized, the buzzer 261 does not operate as a result of the pen-lift signal on the line.

What is claimed is:

1. In a telescriber system in which a pair of transciever units are connected by a pair of conductors and a common ground, each unit including the combination of: a writing element movable along two coordinates of position; two control channels one corresponding to each of said coordinates, each control channel including a drive means responsive to a signal for positioning the writing element along the corresponding coordinate, means coupled to the drive means for generating a signal proportional to the position of the writing element along the corresponding coordinates, a low-pass filter having an input and an output terminal, means connecting one of the conductors of the pair of conductors to the input terminal of the filter, an amplifier having an input and an output terminal, and means connecting the output terminal of the filter and the signal from said signal generating means to the input terminal of the amplifier; a first relay having a receive condition and a transmit condition for connecting the output terminal of the amplifier in each channel to the drive means when in the receive condition and to the input terminal of the filter to develop a signal relative to ground on the one conductor when in the transmit condition; a second normally open relay coupled to the conductors and the drive means and responsive to a signal on the conductors in relation to ground for closing to activate the drive means; switch means coupled to the first relay for actuating the first relay to the transmit condition when it is desired to send a message; and means coupled between the first and second relays for preventing the switch means from actuating the first relay when the second relay is closed.

2. Apparatus as defined in claim 1 further comprising means coupled to the second relay for advancing a strip of paper under the writing element by preset incremental amounts when the second relay is released from its closed state; first switch means coupled to the paper advance means for closing when the paper is stopped and opening when the paper is advancing; second switch means for momentarily grounding both conductors to release the second relay; a third relay coupled to the first switching means for operating when the first switching means is closed and releasing when the first switching means is open; a fourth relay; means for closing the fourth relay when both the second and third relays are released; and means coupled to the fourth relay, when closed, for resetting the paper means for operation by a subsequent release of the second relay.

3. Apparatus as defined in claim 1 further comprising means for advancing a paper strip under the writing element in steps; means responsive to release of said second relay for activating the paper advance means to step the paper strip; and switching means including a switch coupled to the first relay for momentarily grounding the conductors to release the second relay and advance the paper only when the first relay is energized, whereby a paper advance can only be initiated when the first relay is in the transmit condition.

4. In a telescriber system in which a pair of transceiver units are connected by a pair of conductors and a common ground, each unit including the combination of: a writing element movable along two coordinates of position; two control channels corresponding to each of said coordinates, each control channel including a drive means responsive to a signal for positioning the writing element along the corresponding coordinate, means coupled to the drive means for generating a signal proportional to the position of the writing element along the corresponding coordinate, a low-pass filter having an input and an output terminal, means connecting one of the conductors to the input terminal of the filter, an amplifier having an input and an output terminal, means coupling the output terminal of the filter and the signal from said signal generating means to the intput terminal of the amplifier; a first relay having a receive condition and a transmit condition for connecting the output terminal of the amplifier in each channel to the drive means when in the receive condition and to the input terminal of the filter when in the transmit condition; and switch means for actuating the first relay to a transmit condition when it is desired to send a message.

5. In a telescriber system in which a pair of transceiver units are connected by a pair of conductors and a common ground, each unit including the combination of: a writing element movable along two coordinates of position; two control channels corresponding to each of said coordinates, each control channel including a drive means responsive to a signal for positioning the writing element along the corresponding coordinate, means coupled to the drive means for generating a signal proportional to the position of the writing element along the corresponding coordinate, summing means having first and second input terminals and an output terminal for generating a signal proportional to the sum of two input signals; a first relay having a receive condition and a transmit condition for coupling the signal generating means in each channel to one of the conductors of the pair of conductors to develop a signal at the conductor when in the transmit condition and for coupling the signal generating means and one of the conductors to the first and second input terminals, respectively, of the summing means and the output of the summing means to the drive means when in the receive condition; a second relay coupled to the conductors and the drive means and responsive to a signal on a conductor for closing to activate the drive means; switch means coupled to the first relay for actuating the first relay to the transmit condition when it is desired to send a message; and means coupled between the first and second relays for preventing the switch means from actuating the first relay when the second relay is closed.

6. In a telescriber system in which a pair of transceiver units are connected by a pair of conductors and a common ground, each unit including the combination of: a writing element movable along two coordinates of position; two control channels corresponding to each of said coordinates, each control channel including a drive means responsive to a signal for positioning the writing element along the corresponding coordinate, means coupled to the drive means for generating a signal proportional to the position of the writing element along the corresponding coordinate, and summing means having first and second input terminals and an output terminal for generating a signal proportional to the sum of two input signals; a first relay having a receive condition and a transmit condition for coupling the signal generating means in each channel to one of the conductors of the pair of conductors to develop a signal at the conductor when in the transmit condition and for coupling the signal generating means and one of the conductors to the first and second input terminals, respectively, of the summing means and connecting the output of the summing means to the drive means when in the receive condition; and switch means for actuating the first relay to the transmit condition when it is desired to send a message.

7. In a telescriber system in which a pair of identical transceiver units are connected by a pair of conductors and a common ground, each unit including a movable writing element, first and second drive means for moving the writing element along two coordinates of positions, first and second signal generating means for producing first and second signals indicative of the two coordinates of position of the writing element, a pair of summing amplifiers each having first and second input terminals and an output terminal, a pair of low-pass filters each having an input terminal and an output terminal, means coupling the output terminal of each filter to the first input terminal of a different amplifier, means coupling the first and sceond signal generating means to the second input terminal of a different amplifier, means coupling each of the conductors to the input terminal of a different filter, a rceeive-transmit relay for connecting the output terminals of the amplifiers to the first and second drive means, respectively, when released and for connecting the output terminals of the amplifiers to the two conductors when actuated, and means for actuating said relay when it is desired to operate the associated unit as a transmitter.

8. A control circuit for interconnecting two telescriber units over a transmission link, each of which has a writing element, drive means for moving the writing element in two-dimensions in response to a pair of information signals, and means coupled to the drive means for generating a pair of information signals indicative of the two coordinates of position of the writing member, said control circuit comprising a receive-transmit relay at each unit for normally connecting the transmission link to said drive means to move the writing element in response to the information signals, and when activated for connecting the transmission link to said means for generating a pair of information signals, switch means for actuating the receive-transmit relay at one of the units when it is desired to operate the unit as a transmitter, an on-off relay at each unit, the on-off relays, when actuated, in turn activating the drive means at both units and disconnecting the receive-transmit relays from said switching means, whereby the receive-transmit relay at only one of the units is energized at a time, and means responsive to the information signals on the transmission link for actuating the on-off relay at both units.

9. Apparatus as defined in claim 8 further including means for advancing paper beneath the writing member, means coupled to the on-off relay for actuating said paper advancing means at both units when the respective on-off relays are released, and switching means for interrupting the information signals on the transmission link to permit the on-off relays to be released and initiate a paper advance.

10. In a telescriber system having two-way communication between two telescriber units over a common transmission line, each unit comprising means responsive to a pair of electrical signals for positioning a writing stylus along two coordinates of position, means for generating a pair of signals indicative of the two coordinates of position of the writing stylus, a pair of low-pass filters, a pair of summing amplifiers each having first and second input terminals and an output terminal, means coupling each of the low-pass filters and the means for generating the position indicative signals to the first and second input terminals, respectively, of a different summing amplifier, switching means having a transmit condition and a receive condition, the switching means in the receive condition connecting the transmission line to the respective low-pass filters, and connecting the output terminals of the amplifiers to the means for positioning the writing stylus, the switching means in the transmit condition connecting the outputs of the amplifiers to the low-pass filters and to the transmission line, whereby the low-pass filters form feedback paths for the amplifiers, and means for actuating the switching means to the transmit or receive condition when it is desired to transmit or receive electrical signals.

11. In a telescriber system having two-way communication between two telescriber units over a common transmission line, each unit comprising: a writing element movable along two coordinates of position; a drive means coupled to the writing element and responsive to a pair of signals for positioning the writing element along the two coordinates of position; a first signal generator means coupled to the drive means for developing a pair of signals indicative of the two coordinates of position of the writing element; a stylus member freely movable relative to the writing element along the two coordinates of position; a second signal generator means coupled to the stylus member for developing a pair of signals indicative of the displacement between the stylus member and the writing element along the two coordinates of position; a summing network having a pair of input terminals and an output terminal coupled to the drive means; means for normally coupling the line and the first signal generator means to the input terminals of the summing network; and means including a manually operated switch for disconnecting the summing network from the drive means and for coupling the second generator means to the drive means and the first generator means to the line when it is desired that the unit operate as a transmitter.

References Cited in the file of this patent

UNITED STATES PATENTS 2,965,714 Adler ------------------ Dec. 20, 1960